United States Patent [19]

Osada et al.

[11] 4,159,730
[45] Jul. 3, 1979

[54] SAFETY WHEEL

[75] Inventors: Isao Osada, Izumi; Shoichi Sano, Tokorozawa, both of Japan

[73] Assignees: Ohtsu Tire & Rubber Co., Ltd., Izumiohtsu; Honda Gikenkogyo Kabushiki Kaisha, Tokyo, both of Japan

[21] Appl. No.: 813,770

[22] Filed: Jul. 7, 1977

[30] Foreign Application Priority Data

Jul. 17, 1976 [JP] Japan ................... 51-85408

[51] Int. Cl.$^2$ ................. B60C 5/00; B60C 17/00
[52] U.S. Cl. ................. 152/158; 152/330 RF; 152/381.1
[58] Field of Search ............ 152/158, 362 R, 330 RF, 152/329, 339, 340, 399, 400–401, 157, 155, 152, 381.1, 381.2

[56] References Cited

U.S. PATENT DOCUMENTS

| 610,622 | 9/1898 | Chambers | 152/158 |
|---|---|---|---|
| 1,300,063 | 8/1919 | Walton | 152/158 |
| 1,420,655 | 6/1922 | Guild | 152/158 |
| 3,780,784 | 12/1973 | Spier | 152/330 RF |
| 4,016,917 | 4/1977 | Victor | 152/381.1 |

FOREIGN PATENT DOCUMENTS

| 2406422 | 8/1975 | Fed. Rep. of Germany | 152/158 |
|---|---|---|---|
| 2428471 | 1/1976 | Fed. Rep. of Germany | 152/158 |

*Primary Examiner*—Albert J. Makay
*Assistant Examiner*—Lawrence E. Williams
*Attorney, Agent, or Firm*—Haseltine, Lake & Waters

[57] ABSTRACT

A tubeless tire and rim assembly including an annular bead lock in the form of an endless train of lock elements interconnected by flexible joints. The bead lock can have not only a fully expanded circular configuration to fit over the rim base but also a partly folded configuration to lie within the inner peripheral circle of the tire. This particularly facilitates the mounting of such bead lock while effectively preventing any improper positioning thereof. An embodiment incorporating a flat-protector together with the bead lock is also contemplated to further improve the driving safety.

13 Claims, 12 Drawing Figures

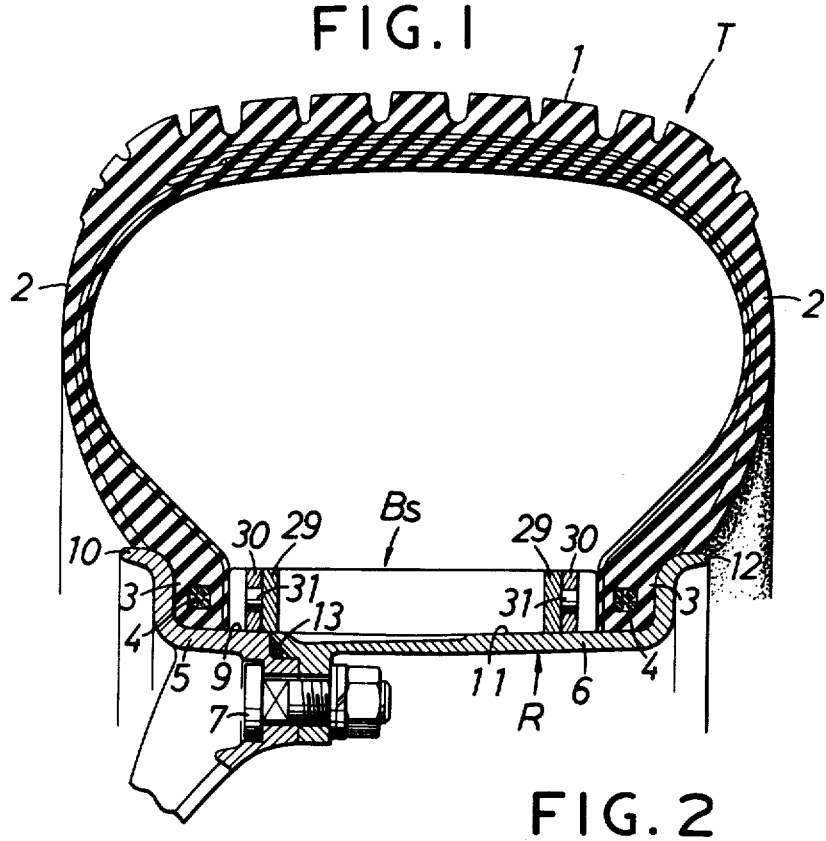
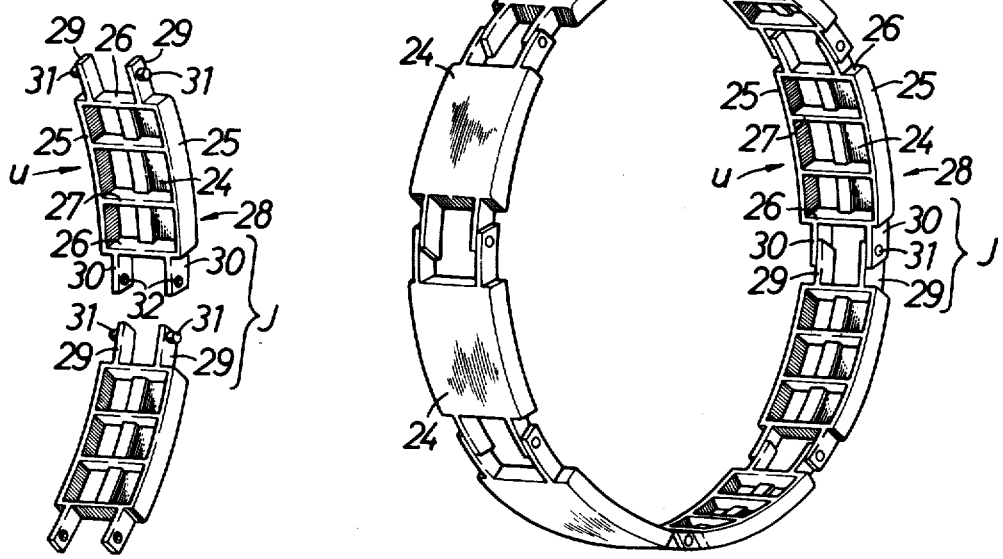

FIG.5 FIG.4
FIG.6
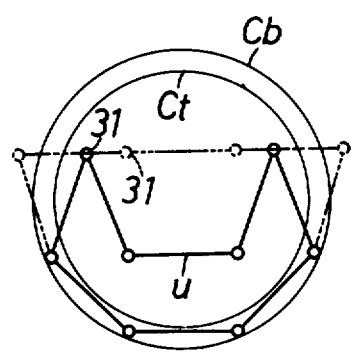
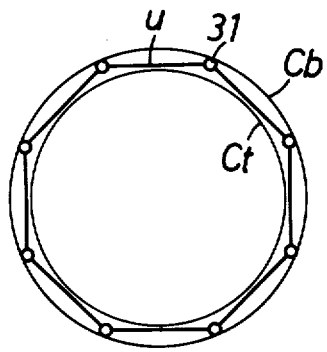
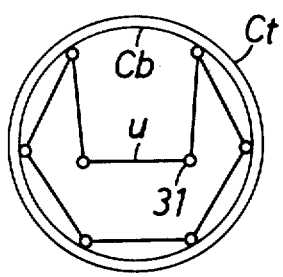
FIG.11 FIG.10 FIG.9 FIG.8 FIG.7
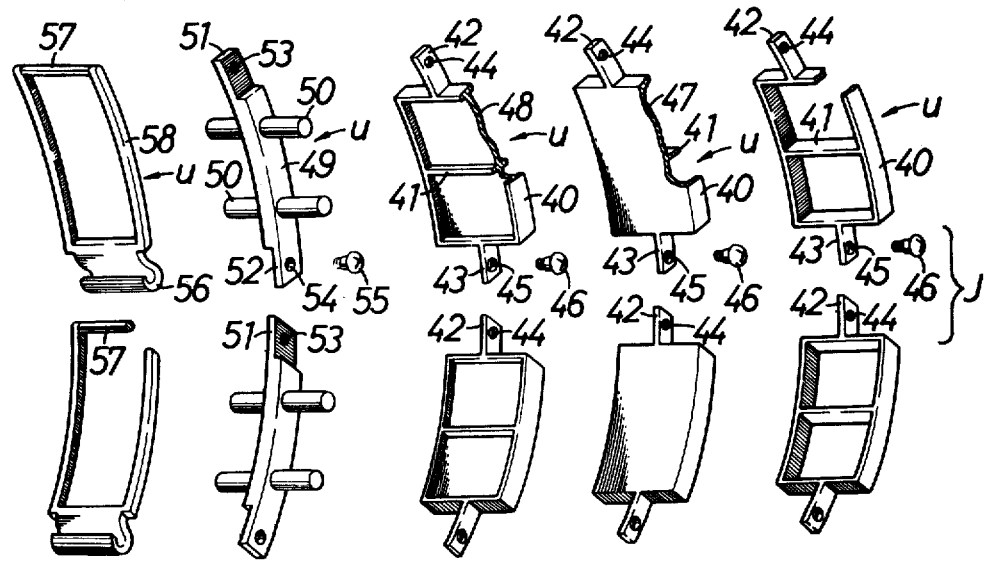

SAFETY WHEEL

BACKGROUND OF THE INVENTION

This invention relates to safety wheels of the type including a tubeless tire and designed so that the bead portions of the tubeless tire are at all times firmly held in position on the rim on which the tire is mounted.

Generally, with wheels fitted with a tubeless tire, any dislocation of the bead portions of the tire may cause air leakage therefrom and, if the air pressure in the tire is reduced to any extreme extent as when the tire is punctured, the tire bead portions are liable to be disengaged from the rim, for example, during turning movement of the vehicle. Such disengagement of the tire bead portions will result in direct contact of the rim with the ground, and thus cause serious troubles such as side slip and reduction in braking efficiency, rendering the vehicle practically unable to travel any further. With such wheels, therefore, it is highly desirable that the tire bead portions, particularly of a tubeless tire, be at all times firmly held in position on the rim irrespective of the air pressure in the tire.

A tire bead holding means intended to meet this requirement has previously been known which includes a bead lock or stopper inserted in the tire to grip the bead portions between the stopper itself and the respective flanges of the rim, on which the tire is mounted, so that the tire bead portions may be held against any axial displacement and hence against disengagement from the rim. The known form of bead lock, however, has been rather poor in assemblability, incurring much trouble when assembled in the tire in a specified position, because of the fixed outer diameter of such bead lock, which is larger than the internal diameter of the tire. If not positioned properly in the tire, the bead lock can exhibit a reduced tire-holding capacity and may cause various troubles, including unbalance of the rotating mass and vibrations, which impair riding comfort of the vehicle.

SUMMARY OF THE INVENTION

Under these circumstances, the present invention seeks to overcome the disadvantages of the prior art safety wheels of the type described and has for its object the provision of a novel safety wheel or tubeless tire and rim assembly of the type described which includes a bead lock adapted to be readily fitted in the tire in exact predetermined position without detracting from its bead-holding capacity to any extent and which is highly effective to improve the driving safety of the vehicle.

According to the present invention, there is provided a safety wheel which comprises a circumferentially divided rim having a pair of spaced opposite flanges, a tubeless tire mounted on said divided rim about the periphery thereof, and an annular bead lock fitted in said tire to grip the bead portions thereof in co-operation with the flanges of said divided rim thereby to hold the bead portions against axial displacement relative to said divided rim, and bead lock consisting of an endless train of rigid lock elements interconnected by flexible joint means and being flexible between a fully expanded circular configuration to fit over the periphery of the medial portion of said divided rim and a partly folded configuration lying in the plane of said tire within the inner peripheral circle thereof.

The above and other objects, features and advantages of the present invention will become apparent from the following description when taken in conjunction with the accompanying drawings, which illustrate a few preferred embodiments of the invention.

BRIEF DESCRIPTION OF THE DRAWINGS

In the drawings:

FIG. 1 is a fragmentary radial cross section of a first preferred form of safety wheel embodying the principles of the present invention;

FIG. 2 is a detached perspective view of the bead lock or stopper shown in FIG. 1;

FIG. 3 is a view similar to FIG. 2, showing two adjacent lock elements of the bead lock in disconnected state;

FIGS. 4 to 6 are schematic diagrams of different configurations of the bead lock, illustrating the procedure of fitting the bead lock in the tire;

FIGS. 7 to 11 are views similar to FIG. 3, illustrating respective modified forms of lock elements usable in the present invention.

DESCRIPTION OF THE PREFERRED EMBODIMENTS

Figure 12:
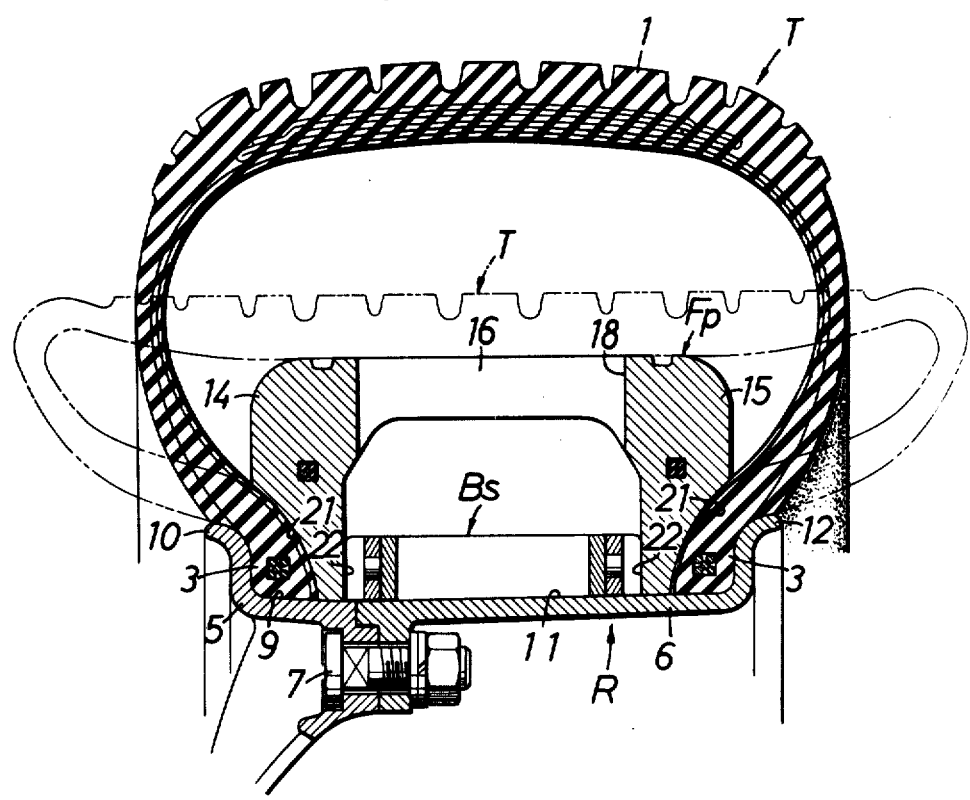
FIG. 12 is a view similar to FIG. 1, illustrating a second preferred embodiment of the present invention, which includes a flat-protector.

Referring to the drawings and first to FIG. 1, there is illustrated a first preferred form of safety wheel embodying the present invention which comprises a tubeless tire T (which will be referred to hereinafter simply as tire), a circumferentially divided rim R and a bead lock or stopper Bs. These components will be described below in detail one after another.

First, the tubeless tire T is of the known construction, including a tread portion 1, side wall portions 2 extending integrally from the opposite sides of the tread portion 1, and bead portions 3 extending from the respective side wall portions 2 integrally therewith in gradually increasing thickness relative thereto. Reference numeral 4 represents circumferentially extending reinforcing wires embedded in the bead portions 3.

As regards the structure of divided rim R, it will be observed that it is constructed in the conventional manner of two, outboard and inboard rim sections 5 and 6 which are fastened together into an integral unit by means of a plurality of fastening bolts 7. The outboard rim 5 includes a body portion having a rim base section 9 of relatively narrow width and a rim flange 10 integrally formed along the outer edge of the body portion to serve the purpose of holding the adjacent bead portion 3 of the tire T in place on the rim R. On the other hand, the inboard rim 6 includes a body portion having a rim base section 11 of relatively large width and a rim flange 12 integrally formed along the outer edge of the body portion to serve the purpose of holding the adjacent tire bead portion 3. The rim base sections 9 and 11 of the outboard and inboard rims 5 and 6 jointly form a cylindrical base surface of the divided rim unit R which serves as a seat for supporting the bead stopper Bs along the inner peripheral surface thereof as well as for bearing engagement with the tire bead portions 3. Reference numeral 13 represents an O-ring interposed between the contacting faces of the outboard and inboard rim sections 5 and 6 at a location radially outside of the fastening bolts 7.

Referring next to FIGS. 2 and 3, the bead lock or stopper Bs of the safety wheel illustrated consists of an endless train of lock elements u interconnected by flexible joint means J.

In this embodiment, the lock elements u are each formed of a rectangular plate member 24 bent to conform with the outer peripheral surface of the rim base sections 9 and 11 and a rectangular frame 28 surrounding the plate member 24 and including a pair of spaced longitudinal sections or frame members 25 and a pair of spaced transverse frame members 26. The combination of plate member 24, longitudinal frame members 25 and transverse frame members 26 is strengthened by a lattice formation of reinforcing ribs 27 to provide rigidity particularly in the transverse direction axially of the wheel assembly. Provided on the frame 28 at one longitudinal end thereof are a pair of spaced parallel lugs 29 which extend from the adjacent transverse frame member 26 longitudinally of the frame 28. Another pair of spaced parallel lugs 30 are provided on the frame 28 at the other longitudinal end thereof and are spaced from each other a distance slightly larger than that between the lugs 29. The lugs 29 are formed on the outside thereof with respective hinge pins 31 while the lugs 30 are each formed with a hole 32 to fittingly receive one or the other of hinge pins 31. The two pairs of lugs 29 and 30 with hinge pins 31 and holes 32 constitute, in combination one flexible joint means J for interconnecting the two adjacent lock elements u for pivotal movement relative to each other about an axis normal to the general plane of the bead lock Bs.

In order to interconnect the two adjacent lock elements u, the lugs 29 on one of the two elements are pushed toward each other against the resilience thereof to reduce the distance therebetween and in this state inserted between the lugs 30, formed on the other lock element, to bring the hinge pins 31 on lugs 29 into alignment with the respective pin-receiving holes 32 in lugs 30. Then the lugs 29 are released to restore their normal relative position under their own resilience so that the hinge pins 31 fit in the respective holes 32. By repeating the procedure, all the lock elements u are connected one after another to complete the bead lock Bs in the form of an endless train of lock elements u. In the bead lock completed in this manner, lock elements u are each rockable relative to either of the two neighboring elements u about the axis of the interconnecting hinge pins 31 at least through a predetermined angle in either direction in the general plane of the bead lock Bs.

The bead lock Bs should have such a heat resistance and rigidity enabling it fully to withstand heat and compressive, bending and other stresses to which it is subjected as when the tire T is punctured. The bead lock Bs should also be a lightweight as possible to prevent any increase in torque resistance of the wheel. It has been found that these requirements can be met by forming the lock elements u, for example, of a nylon resin material containing 5% to 90% (preferably 10% to 50% for moldability and characteristic properties required of molded products) of glass fiber, an aluminum alloy or steel.

Description will now be made of the process of assembling the wheel illustrated.

First, the bead lock Bs is fitted in the tubeless tire T in the manner illustrated in FIGS. 4 to 6. Schematically illustrated in FIG. 4 is the dimensional relationship between the circle Cb circumscribed about the bead lock Bs as fully extended into a circular configuration and the inner peripheral circle Ct of the tire T (lock elements u being represented by respective straight line segments for convenience's sake). As will be apparent from FIG. 4, in order that the bead lock Bs may be built in the tire T, it must be deformed so as to lie within the inner peripheral circle Ct of the tire. To this end, as shown in FIG. 5, at least two consecutive lock elements u (in the illustration, three such elements) are moved inwardly into a position nearly symmetrical to their initial normal position and then two opposite neighboring elements u are moved toward each other so that the remaining lock elements u are rocked inwardly of the circumscribed circle Cb until the circle circumscribed about the bead lock has a diameter smaller than that of the inner peripheral circle Ct of tire T, as indicated at Cb in FIG. 6. This partly folded configuration of bead lock Bs obviously enables it to be moved freely into and out of the tire T axially thereof.

In order that the bead lock Bs may be deformed to define a circumscribed circle smaller than the inner peripheral circle Ct of tire T, as described above, the bead lock must include lock elements in a number not less than a definite minimum, which is determined geometrically. That is to say, the least allowable number of lock elements u usable to form such bead lock Bs is five where all the lock elements are of equal length and four where at least one lock element has a length differing from that of the others.

The bead lock Bs deformed as described above is inserted into the tire T centrally thereof and then fully expanded radially outwardly into its initial circular configuration, shown in FIG. 4, to fit between the spaced opposite tire bead portions 3.

Subsequently, the outboard and inboard sections 5 and 6 of divided rim R are built into the tire T from opposite sides thereof and fixed together by means of fastening bolts 7. The rim base portions 9 and 11 of the outboard and inboard rim sections 5 and 6 thus fixed together define a smooth cylindrical base surface which fits the inner peripheral surface of the bead lock Bs and the bead portions 3 of tire T are firmly gripped between the opposite side faces of bead lock Bs and the respective flanges 10 and 11 of the divided rim R. In other words, in the tire and rim assembly, the bead lock Bs serves to force the tire beads 3 against the respective rim flanges 10 and 11, and thus the tire T is securely mounted on the divided rim R in tightly sealed relation thereto.

Several modified forms of bead lock Bs are illustrated in FIGS. 7 to 11. In the modification of FIG. 7, lock elements u are each formed of a rectangular frame 40 bent to conform with the outer peripheral surface of the rim base sections 9 and 11 (FIG. 1) and a transversely extending rib 41 formed integral with the frame 40 in the middle thereof. As illustrated, a pair of lugs 42 and 43 are formed on the frame 40 at its opposite longitudinal ends in positions slightly sidewise offset from the longitudinal axis of the frame in opposite directions. One of the lugs, 42, is formed with a tapped hole 44 while the other lug 43 is formed with a plain through hole 45. In interconnecting two such lock elements u, they are brought together so that the lugs 42 and 43 on the respective elements are laid on each other with the tapped and plain holes 44 and 45 aligned with each other and a headed screw 46 is fitted through the plane hole 45 into threaded engagement with the tapped hole 44.

FIGS. 8 and 9 illustrate a further modification of the lock elements shown in FIG. 7. This modification includes a ribbed rectangular frame 40 of substantially the same structure as shown in FIG. 7 and increased in strength with an integral plate member provided thereon. The plate member may be formed on the concave side of the frame 40, as indicated at 47 in FIG. 8, or on the convex side of the frame, as indicated at 48 in FIG. 9, or midway of the thickness of the frame, as desired.

In the embodiment of FIG. 10, lock elements u each include a bar-like body 49 bent to conform with the outer peripheral surface of the rim base and lock members in the form of cylindrical lateral projections 50 provided on each lateral side of the body 49 in positions spaced from each other longitudinally thereof. A pair of lugs 51 and 52 are integrally formed on the body 49 at the opposite longitudinal ends thereof in laterally offset relation to each other. Like lugs 42 and 43 in the embodiment of FIG. 7, lugs 51 and 52 are formed with a tapped hole 53 and a plain hole 54, respectively. For interconnection of two adjacent lock elements u, adjoining lugs 52 and 53 thereon are laid over each other so as to align the tapped and plain holes 53 and 54 with each other and pivotally connected by means of a headed screw 55 in quite the same manner as described in connection with the embodiment of FIG. 7.

Though, in the above description, lock elements u have been shown as interconnected by screw means 46 or 55, it will be readily understood that they may also be interconnected by employing a split pin or the like in place of the screw means.

In the embodiment shown in FIG. 11, each of lock elements u is comprised of a rectangular frame 58 which includes a hook formation 56 provided on one longitudinal end and a link portion 57 forming part of the frame at the other longitudinal end thereof. The link portion 57 takes the form of a round bar or pin of circular cross section conforming with the inner peripheral surface of hook formation 56. For interconnection of such lock elements u, the hook formation 56 on one lock element is brought into engagement with the link portion 57 of the other lock element.

FIG. 12 illustrates another preferred form of safety wheel embodying the present invention, which is of substantially the same basic structure as the one shown in FIG. 1 and includes flat-protector Fp inserted in the tire T to serve the purpose of restraining tire flattening as occurring when the tire is punctured thereby to maintain the load-carrying capacity of the tire despite of the failure of air pressure therein. As illustrated, the flat-protector Fp is gripped together with the bead portions 3 of tire T between the bead lock Bs and the rim flanges 10 and 12.

The flat-protector Fp is formed as a whole in an annular configuration to fit in the tire T around the entire periphery thereof. Also, it is formed of an elastic material such as synthetic rubber, natural rubber or synthetic resin material and in special cross-sectional shape so as to exhibit an appropriate rigidity to fulfil its intended function while retaining an appropriate elasticity.

Specifically, the flat-protector Fp is shaped bisymmetrical, including a pair of annular, spaced opposite side wall portions 14 and 15 and a plurality of circumferentially spaced bridge wall portions 16 interconnecting the side wall portions 14 and 15. As seen in FIG. 12, the flat-protector Fp as a whole has a portal or saddle-like cross-sectional shape. The bridge wall portions 16 define a plurality of air holes 18 in the flat-protector in co-operation with the opposite side wall portions 14 and 15 and through which holes the spaces outside and inside of the flat-protector Fp communicate with each other.

Also, the side wall portions 14 and 15 of the flat-protector Fp are formed at the bottom on their respective outsides with bead-bearing surfaces 21 which are concave-shaped to snugly fit the adjacent interior surface of the respective bead portions 3 of tire T. On their insides, the side wall portions 14 and 15 are formed at the bottom with lock-bearing surfaces 22 which are substantially flat to make abutting contact with the opposite side surfaces of bead lock Bs.

It is to be noted that, as long as the tire T is held inflated with air at a prescribed pressure, the wheel is in its normal state to support the weight of the vehicle by the air pressure in the tire T, as indicated in FIG. 12 by the solid lines, but, once the air pressure is lost by the puncturing of tire T or similar accident, the tire collapses and its tread portion 1 now being flattened comes into pressure engagement with the top surface of flat-protector Fp, as illustrated in FIG. 12 by the chain-dotted lines, so that the vehicle weight is supported by the flat-protector Fp, now acting as a substitute for the air pressure lost in tire T. It is to be noted that, because of the portal or saddle-like cross-sectional formation of the flat-protector Fp, comprising spaced opposite side wall portions 14 and 15 and interconnecting bridge wall portions 16, the load applied to the tire T is effectively distributed between and sustained by the opposite side walls 14 and 15, which are kept from any sidewise tilt under the load. This makes it possible for the driver to drive the vehicle safely, for example, to the nearest repair shop.

In this connection, experiments have been conducted on the tire and rim assembly shown in FIG. 12 with no bead lock Bs incorporated therein and in which assembly the bead portions 3 of tire T are held in place against the rim flanges by the opposite side wall portions 14 and 15 of flat-protector Fp under the resiliency thereof. In the experiments, when the tire T was flattened with reduction in pneumatic pressure therein as by puncturing, the vehicle could safely travel at speed of 50 kilometers per hour only over a distance of approximately 70 kilometers and heat generated during the travel by frictional engagement of the interior surface of the flattened tire tread 1 with the top surface of flat-protector Fp impaired the resiliency of the latter to such an extent as to render its side wall portions 14 and 15 readily flexible inwardly under the thrust of the tire beads 3. This naturally resulted in substantial reduction in the effect of flat-protector Fp to resiliently hold the tire beads 3 in place on the rim and incurred the danger of tire breakage.

In contrast, with the embodiment of the present invention shown in FIG. 12, in which bead lock Bs is arranged between the side wall portions 14 and 15 of flat-protector Fp so as to force these side wall portions and the tire bead portions 3 jointly against the rim flanges 10 and 12, it has been found that the vehicle can be driven at a speed of 50 kilometers per hour over a distance of 200 kilometers or more without any danger of the flat-protector being disengaged from between the bead lock Bs and tire bead portions 3.

It will be readily appreciated from the foregoing description that the structure of the safety wheel according to the present invention has various advantages over the prior art, as will be described hereinafter.

Firstly, the bead lock or stopper Bs can readily be fitted in the tire in exact position between the bead portions thereof despite the fact that the external diameter of the bead lock in its normal state of use is larger than the internal diameter of the tire, since the bead lock is in the form of an endless train of lock elements interconnected by flexible joint means and can have either a fully expanded circular configuration to fit over the base portion of the divided rim or a partly folded configuration lying within the inner periphery of the tire.

Secondly, the bead lock in the safety wheel can hold the tire bead portions at all times firmly in place on the wheel rim irrespective of the air pressure in the tire since the elements of the bead lock have each a sufficiently large rigidity in the axial direction of the tire to firmly grip the tire bead portions in co-operation with the rim flanges.

Further, in cases where the flexible joint means includes a hinge pin, which may be designed to exhibit any desired shear strength, any elongation of the bead lock under centrifugal force can be effectively prevented by the strength of the joints combined with the rigidity of the lock elements. This not only enables such bead lock to hold the tire beads against any displacement even during quick turning movement or high speed travel of the vehicle but also to effectively prevent the tire beads from being disengaged from the rim even when the tire is punctured, thus contributing greatly to the driving safety of the vehicle.

While the invention has been shown and described in several forms, it will be apparent to those skilled in the art that it is not so limited but is susceptible of various changes and modifications without departing from the spirit and scope of the claimed invention.

What is claimed is:

1. A safety wheel comprising a circumferentially divided rim having a pair of spaced opposite flanges, a tubeless tire mounted on said divided rim about the periphery thereof, and an annular bead lock fitted in said tire to grip the bead portions thereof in co-operation with said flanges of said divided rim thereby to hold the bead portions against axial displacement relative to said divided rim, said bead lock comprising an endless train of rigid lock elements and flexible joint means flexibly connecting the rigid lock elements for movement between a fully expanded circular configuration and a retracted configuration and wherein in the expanded fully configuration the lock elements fit over the periphery of the medial portion of said divided rim and in the retracted configuration the lock elements lie in the plane of said tire within the inner peripheral circle thereof.

2. A safety wheel as claimed in claim 1, further comprising an annular flat-protector mounted in said tire and inserted between said bead lock and the bead portions of said tubeless tire and fixedly held together with the bead portions against the flanges of said divided rim under the effect of said bead lock, said flat-protector serving, when air pressure in said tire is reduced below a predetermined level, to restrain tire flattening thereby to maintain the load-carrying capacity of said tire.

3. A safety wheel as claimed in claim 1, in which said flexible joint means comprises a pivotal joint interconnecting said lock elements for free pivotal movement relative to each other in the general plane of said bead lock.

4. A safety wheel as claimed in claim 1, in which said lock elements each includes a rectangular frame comprised of a pair of spaced longitudinal members bent to conform with the outer peripheral surface of the base portion of said divided rim and a pair of spaced transverse members to be pressed against the respective bead portions of said tubeless tire.

5. A safety wheel as claimed in claim 4, in which said rectangular frame further includes a lattice formation of reinforcing ribs.

6. A safety wheel as claimed in claim 4, in which each of said lock elements includes a reinforcing plate member secured to said frame.

7. A safety wheel as claimed in claim 3, in which said pivotal joint includes a first pair of spaced parallel lugs formed on one of the two adjoining transverse frame members of two adjacent lock elements, a second pair of spaced parallel lugs formed on the other of said two adjoining transverse frame members and spaced from each other by a distance slightly larger than that between said first pair of spaced parallel lugs, and pivot means interconnecting said first and second pairs of spaced parallel lugs for pivotal movement relative to each other about an axis normal to the general plane of said bead lock.

8. A safety wheel as claimed in claim 7, in which said first and second pairs of spaced parallel lugs are made of resilient material and said pivot means includes a pair of hinge pins formed on the respective lugs in said first pair to extend laterally outwardly therefrom and a pair of holes formed in the respective lugs in said second pair to receive said hinge pins.

9. A safety wheel as claimed in claim 3, in which said pivotal joint includes a pair of lugs respectively formed on the two adjoining transverse frame members of two adjacent lock elements and pivot means interconnecting said lugs for pivotal movement relative to each other about an axis normal to the general plane of said bead lock.

10. A safety wheel as claimed in claim 1, in which said lock elements each includes a bar-like body bent to conform with the outer peripheral surface of the base portion of said rim and at least one lock member projecting laterally outwardly from the opposite sides of said body.

11. A safety wheel as claimed in claim 10, in which said pivotal joint includes a pair of lugs formed on the adjoining ends of the respective bodies of two adjacent lock elements and pivot means interconnecting said lugs for pivotal movement relative to each other about an axis normal to the general plane of said bead lock.

12. A safety wheel as claimed in claim 4, in which said pivotal joint includes a hook formation on one of the adjoining transverse frame members, of two adjacent lock elements and a link formation provided on the other of said adjoining transverse frame members for pivotal engagement with said hook formation.

13. A safety wheel as claimed in claim 2, in which said annular flat-protector includes a pair of annular spaced opposite side wall portions and a plurality of circumferentially spaced bridge wall portions interconnecting said side wall portions and defining in co-operation with the latter a plurality of air holes through which the spaces outside and inside of said annular flat-protector communicate with each other.

* * * * *